US012696230B2

(12) United States Patent　　(10) Patent No.:　US 12,696,230 B2
Passler　　(45) Date of Patent:　　　Jul. 28, 2026

(54) DETERMINATION AND COMPENSATION FOR SYSTEMATIC ERRORS IN PASSIVE GEOLOCATION OF WIRELESS LOCAL AREA DEVICES

(71) Applicant: SR Technologies, Inc., Sunrise, FL (US)

(72) Inventor: Mark Passler, Rockville, MD (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 19/400,927

(22) Filed: Nov. 25, 2025

(65) Prior Publication Data

US 2026/0164398 A1　　Jun. 11, 2026

Related U.S. Application Data

(60) Provisional application No. 63/728,415, filed on Dec. 5, 2024.

(51) Int. Cl.
*H04W 24/10*　　(2009.01)
*H04W 56/00*　　(2009.01)
*H04W 64/00*　　(2009.01)

(52) U.S. Cl.
CPC ........... *H04W 64/00* (2013.01); *H04W 24/10* (2013.01); *H04W 56/0015* (2013.01)

(58) Field of Classification Search
CPC ...... H04W 64/00; H04W 24/10; H04W 56/00
See application file for complete search history.

(56) References Cited

U.S. PATENT DOCUMENTS

| | | | |
|---|---|---|---|
| 2006/0273960 A1* | 12/2006 | Murphy | ................... G01S 5/06 |
| | | | 342/465 |
| 2011/0171973 A1* | 7/2011 | Beck | ................... H04B 17/309 |
| | | | 455/456.2 |
| 2025/0097328 A1* | 3/2025 | Son | ....................... H10H 20/857 |

* cited by examiner

*Primary Examiner* — Michael T Vu
(74) *Attorney, Agent, or Firm* — Goodwin Procter LLP

(57)　　　　ABSTRACT

A method for operating a measuring station to generate a circular error probability (CEP) ellipse that encompasses the location of a target wireless station is described. The method includes receiving a plurality of beacons transmitted by the target wireless station. A plurality of Time of Departures (TODs) and a plurality of Time of Arrivals (TOAs) corresponding to the plurality of beacons are identified. A plurality of Times of Flight (TOFs) are determined based on the plurality of TODs and the plurality of TOAs. A plurality of CEP ellipses are calculated based, at least in part, on the plurality of TOFs. It is then determined whether the plurality of CEP ellipses exhibit an orbital radius. If so, a curvature radius of the plurality of CEP ellipses is calculated and an adjusted CEP ellipse is generated encompassing a location of the target wireless station based on the curvature radius.

20 Claims, 11 Drawing Sheets

Beacon Frame Structure

200

| MAC Header 201 | Frame Body 202 | Variable 203 | FCS 204 |

| Timestamp (TSF) 211 | Beacon Interval (TTBT) 212 | Capability info 213 | SSID 214 | Supported Rates 215 | Optional 216 |

Mandatory

DETERMINATION AND COMPENSATION FOR SYSTEMATIC ERRORS IN PASSIVE GEOLOCATION OF WIRELESS LOCAL AREA DEVICES

CROSS-REFERENCE TO RELATED APPLICATIONS

This application claims priority to U.S. Provisional Application No. 63/728,415, filed on Dec. 5, 2024 and titled "DETERMINATION AND COMPENSATION FOR SYSTEMATIC ERRORS IN PASSIVE GEOLOCATION OF WIRELESS LOCAL AREA DEVICES," the entire disclosure of which is hereby incorporated by reference.

TECHNICAL FIELD

The present disclosure relates to the geo-location of wireless devices, and in particular to a method, device, and system for the geo-location of wireless devices.

INTRODUCTION

This disclosure relates to the location of wireless local area network (WLAN) devices that are based upon the IEEE 802.11 technology, commonly known as Wi-Fi. The location of WLAN devices can be performed using various methods that may be classified as active, passive, or as a combination of active and passive. In a passive location scheme, a device referred to as the "wireless measuring station" monitors the time of arrival (TOA) of non-stimulated transmissions from a device referred to as the "target wireless station." Common methods to determine the location of a target wireless station include using multiple wireless measuring stations that record simultaneous TOA measurements at different points, where the time difference of arrival (TDOA) between the TOAs at pairs of wireless measuring stations produce hyperbolas and the location of the target wireless station is the intersection of the hyperbolas. Another method uses a single mobile wireless measuring station that records time of departure (TOD) and TOA of a transmission from the target wireless station. To derive an estimated position for the target wireless station, a best fit to the set of time of flight (TOF) measurements is determined, often using minimization of the summation of the squared residuals (SSR) with methods such as the Gauss-Newton method and the Levenberg-Marquardt method, after which a circular error probability (CEP) ellipse is calculated.

However, existing passive geolocation methods suffer from deficiencies related to systematic timing errors. For instance, when a beacon (i.e., a wireless signal transmitted by a target wireless station) is received by an un-associated wireless measuring station, the wireless measuring station may not update its timer to synchronize with the target wireless station's timing synchronization function (TSF). Instead, it may measure the TOA using its own timer. This relative drift between the clocks of the target wireless station and the wireless measuring station creates systematic errors that can cause the actual location of the target wireless station to fall outside of the calculated CEP ellipses. While some methods attempt to mitigate systematic errors by using time, TOF segments, and/or orbits to split results into sets of CEP ellipses and then merge them, these methods often do not fully eliminate the effects of periodic systematic errors. When systematic errors occur, the resulting CEP ellipses exhibit an orbiting phenomenon around the actual location in the same direction as the wireless measuring station orbits the target wireless station, leading to inaccurate location estimates that do not encompass the true position of the target wireless station.

SUMMARY

In various examples, the subject matter described herein relates to determining and compensating for systematic errors in passive geolocation of wireless local area devices. In particular, systems and methods are provided herein for identifying when circular error probability (CEP) ellipses exhibit orbital characteristics due to systematic timing errors and compensating for such errors by calculating curvature radii and adjusting CEP ellipse sizes to encompass the actual location of target wireless stations. According to some embodiments, a method for operating a measuring station to generate a CEP ellipse that encompasses the location of a target wireless station includes receiving, at a measuring station, a plurality of beacons transmitted by the target wireless station. A plurality of Time of Departures (TODs) and a plurality of Time of Arrivals (TOAs) corresponding to the plurality of beacons are identified. A plurality of Times of Flight (TOFs) corresponding to the plurality of beacons are determined based on the plurality of TODs and the plurality of TOAs. A plurality of CEP ellipses for the target wireless station are calculated based, at least in part, on the plurality of TOFs. It is then determined whether the plurality of CEP ellipses exhibit an orbital radius. In response to determining that the plurality of CEP ellipses do exhibit an orbital radius, a curvature radius of the plurality of CEP ellipses is calculated and an adjusted CEP ellipse encompassing a location of the target wireless station is generated based on the curvature radius of the plurality of CEP ellipses.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

Figure (FIG. 1 is a block schematic diagram of an example IEEE 802.11 infrastructure network, in accordance with some embodiments.

Figure 1:
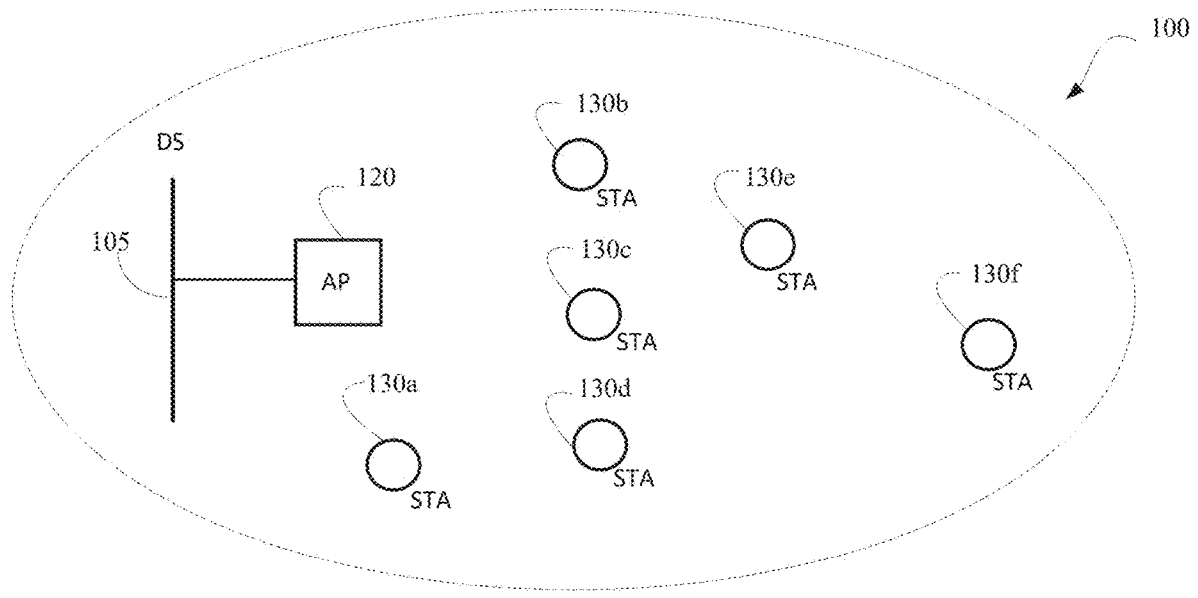

While the present disclosure is subject to various modifications and alternative forms, specific embodiments thereof have been shown by way of example in the drawings and will herein be described in detail. The present disclosure should not be understood to be limited to the particular forms disclosed, but on the contrary, the intention is to cover all modifications, equivalents, and alternatives falling within the spirit and scope of the present disclosure.

DETAILED DESCRIPTION

This disclosure relates to the passive location of wireless local area network (WLAN) devices that are based upon the IEEE 802.11 technology, commonly known as Wi-Fi. A method to determine the location of a target wireless station is to use a single mobile wireless measuring station that records time of departure (TOD) and TOA of a transmission from the target wireless station.

FIG. 1 is a block schematic diagram of an example IEEE 802.11 infrastructure network 100. A number of stations, 130a, 130b, 130c, 130d, 130e, and 130f (collectively referred to as "stations 130") may be associated to a wireless access point (AP) 120, which, in turn, may be connected to a hard wired distribution system (DS) 105. Thus, "wireless device" or "wireless station" as used throughout this disclosure need not be totally wireless and may be connected to a wired network. In the IEEE 802.11 infrastructure network 100, AP 120 periodically transmits beacons to (i) allow stations 130 to locate and identify the network and (ii) convey information to the stations 130, in particular, the timestamp, the service set identifier (SSID), the beacon interval, and the capability information.

Figure 2:
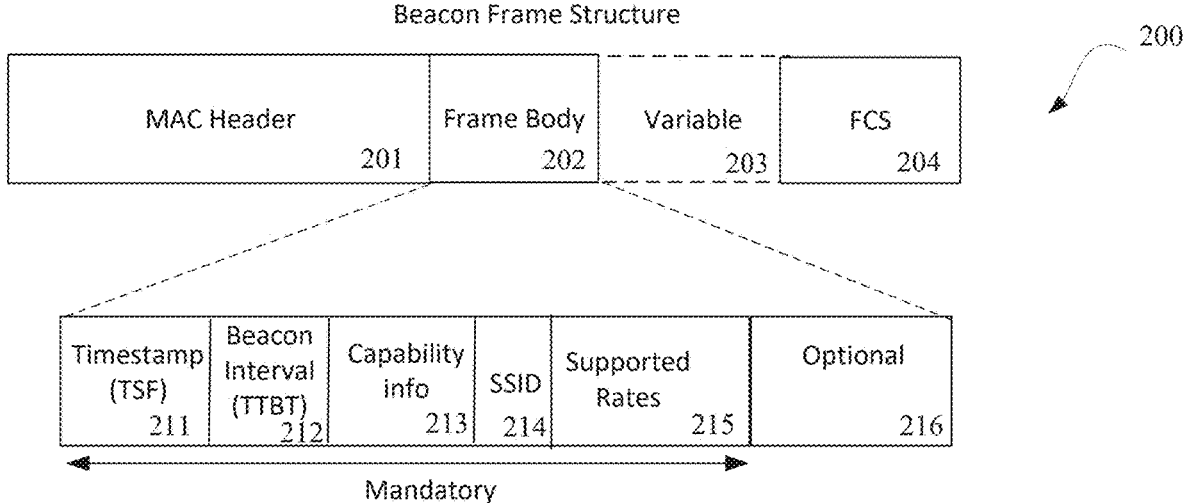
FIG. 2 is an exemplary beacon frame structure that can be transmitted by an access point (AP), in accordance with some embodiments.

FIG. 2 is an example of the beacon frame structure 200 that can be transmitted by AP 120. The beacon 200 includes four parts: (i) a medium access control (MAC) header 201, (ii) a frame body 202, (iii) a variable part 203, and (iv) a frame check sequence (FCS) 204. The MAC header 201 contains the MAC address of AP 120, which provides an identity for the AP 120. The frame body 202 includes a mandatory set of fields and an optional set of fields. The mandatory set includes (i) the timestamp, referred to as the timing synchronization function (TSF) 211, (ii) the beacon interval, referred to as target beacon transmission time (TBTT) 212, (iii) the capability information 213, (iv) the service set identifier (SSID) 214, and (v) the supported rates 215. The TSF 211 is included in every beacon transmission and is the time that the beacon is transmitted. The TSF 211 therefore corresponds to the TOD of the beacon. The AP 120 can be identified by its MAC address, included in the MAC header 201, and/or the SSID 214.

Figure 3:
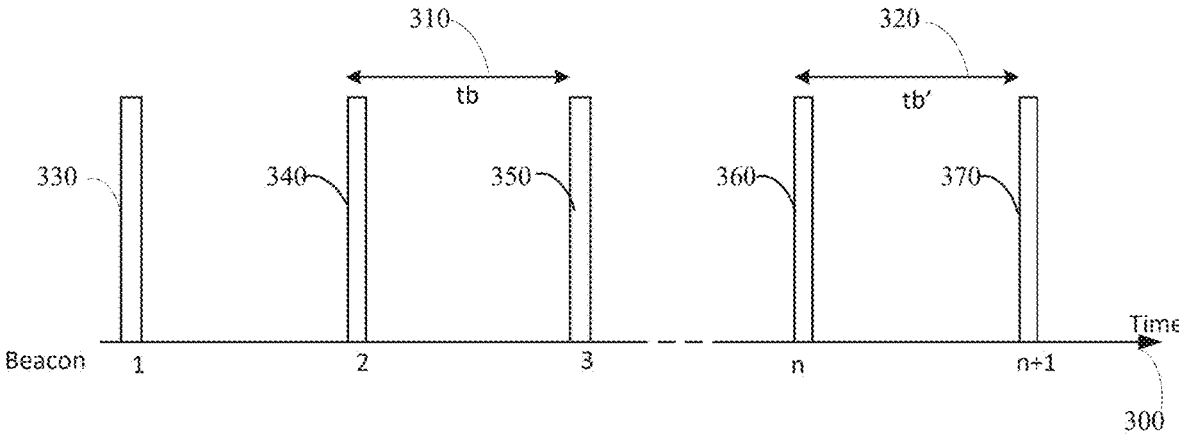
FIG. 3 is a diagram of exemplary transmissions of beacons with respect to time, in accordance with some embodiments.

FIG. 3 is a diagram illustrating example transmissions of the beacons with respect to the time axis 300. The AP 120 attempts to transmit beacons, for example beacons 330, 340, 350, 360 and 370, at a regular time interval tb 310, known as the Target Beacon Transmission Time (TBTT) 212. Generally, the time tb' 320 between two beacons is greater or less than the TBTT. AP 120 advertises the TBTT 212, but the beacon transmission may be delayed beyond TBTT because of other traffic either in the network 100 or other networks in the same vicinity. In addition, because a beacon is never retransmitted, if the reception of the beacon at one of the stations 130 is corrupted for any reason, that station may not receive every beacon. In the infrastructure network 100, associated stations 130 update their own TSF timers with the value of the TSF 211 that they receive from the AP 120 in the beacon frame, modified by any processing time required to perform the update operation. Hence, associated stations 130 maintain synchronous timing with the AP 120. When the beacon TOA is being measured by an unassociated wireless measuring station, the wireless measuring station does not update its timer to synchronize with the TSF 211 but will measure the TOA using its own timer. Generally, the timer accuracy for the AP 120 is up to 5 parts per million (ppm) (i.e., 5 microsecond of error per second). Hence, the relative drifts between the timers of the AP 120 and the wireless measuring station need to be accounted for.

The time that each beacon is transmitted by AP 120 (i.e., the TOD) is provided as the TSF 211 in the beacon. A wireless measuring station receives the beacon, notes the TOA, and notes the TSF value, which can be used as the TOD of the beacon.

Figure 4:
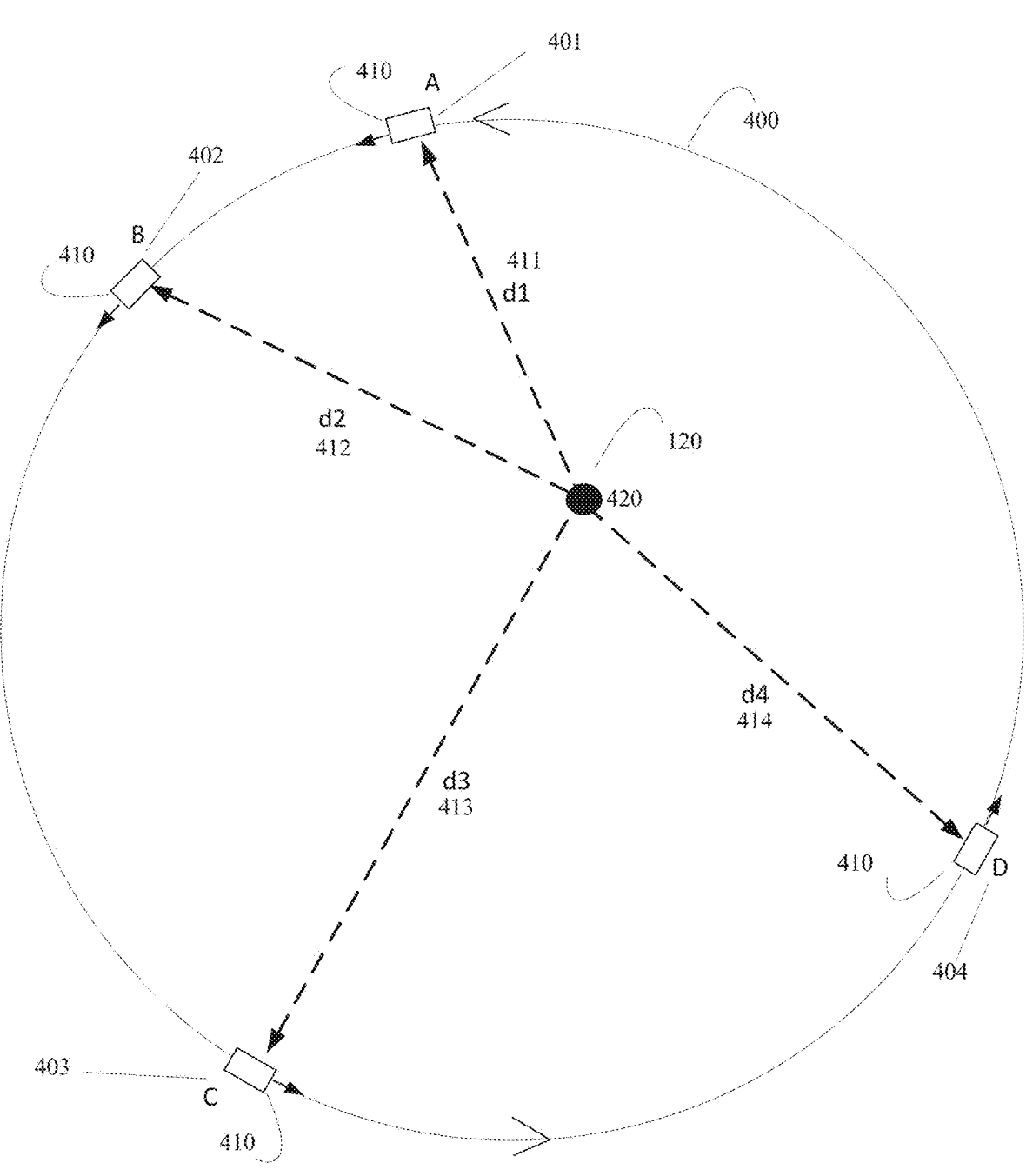
FIG. 4 is an exemplary passive location system using a single wireless measuring station and depicts a scenario where the wireless measuring station is moving in an orbit measuring the TOAs of beacons transmitted from a target wireless station, at a location which is within the orbit, in accordance with some embodiments.

FIG. 4 is an example of a passive location system using a single wireless measuring station 410. A scenario is depicted where the wireless measuring station 410 is moving in an orbit 400 and measuring the TOAs of the beacons transmitted from a target wireless station, AP 120, at location 420, which is within the orbit 400. The term "target wireless station" is interchangeable with AP 120, but the device that is being passively located is referred to as the target wireless station 120.

In the example depicted in FIG. 4, the wireless measuring station 410 is moving anticlockwise through points A 401, B 402, C 403, and D 404. As wireless measuring station 410 moves along orbit 400, it is constantly measuring the TOAs of the beacons that are transmitted by the target wireless station 120 and recording the associated TSFs. The distances between the wireless measuring station 410 and the target wireless station 120, when the wireless measuring station 410 is at points A 401, B 402, C 403 and D 404 are d1 411, d2 412, d3 413, and d4 414, respectively. If the time that each beacon is transmitted (i.e., the TOD), is known, then the time of flight (TOF) of the transmission can be calculated as TOF=TOA−TOD. The TOF of the beacon transmission from target wireless station 120, to the wireless measuring station 410 is proportional to the distance between the wireless measuring station 410 and the target wireless station 120 at each point. In this example, the wireless measuring station 410 may be airborne and flying in the orbit 400 around an area of interest that contains the target of interest, i.e., the wireless station 120.

To derive an estimated position for the target wireless station 120, a best fit to the set of TOF measurements is determined. One method for fitting the set of TOF measurements to a target position is by use of a minimization of the summation of the squared residuals (SSR). Methods used to define the direction and step size of the minimum include the Gauss-Newton method and the Levenberg-Marquardt method. Once this minimum is found, a circular error probability (CEP) ellipse may be calculated.

When the beacon is received by the un-associated wireless measuring station 410, the wireless measuring station 410 will not update its timer to synchronize with the target wireless station 120 TSF but will measure the TOA using its own timer. Therefore, the relative drift between the clocks of the target wireless station 120 and the wireless measuring station 410 need to be assessed and compensated for. In some examples, the relative drift between (i) the TSF time in the beacons from the target wireless station 120 received by the wireless measuring station 410, (ii) the reported TOD (i.e. the TSF 211), (iii) the TOA measurement by the wireless measuring station 410, and (iv) the synchronization between the timers of the target wireless station 120 and the wireless measuring station 410 is assessed and compensated for. In some examples, the synchronization includes (i) applying a factor α for correcting the offset of the timer associated with the wireless measuring station 410, (ii) applying a factor β for correcting a ratio of timer rates between the two timers, and (iii) applying a factor γ for correcting changes in a timer rate ratio between the two timers.

Over time, more and more TOF measurements will be determined by wireless measuring station 410. If it can be assumed that the values for α, β, and γ are substantially constant over time, the accuracy of the location calculations will increase with the quantity of measurements. Generally, as time progresses, there is an increasing chance that the relative timer drift between the target wireless station 120 and the wireless measuring station 410 may undergo a change such that the values for α, β and γ vary. Such variations, if constant for period, may be referred to as systematic errors.

The location estimate may be calculated using the CEP ellipse. Generally, a CEP ellipse with 95% confidence is used. In other words, there is 95% confidence that the location of target wireless station 120 is within the CEP ellipse. To mitigate systematic errors, some methods use time, TOF segments, and/or orbits to split the results into sets of CEP ellipses and then merge them. These methods can improve the accuracy of the CEP ellipses, but often they do not fully eliminate the effects of periodic systematic errors.

Accordingly, methods and apparatuses are disclosed herein that compensate for systematic errors that cause the resulting CEP ellipses to orbit around the actual location in the same direction as the wireless measuring station 410 orbits the target wireless station 120. When systematic errors are present, the CEP ellipse orbiting phenomenon is identified, the radius of curvature calculated, and the size of the CEP ellipse diameter adjusted accordingly.

In an ideal situation, where clocks are well behaved and errors are random, the position of the center of the CEP ellipse relative to the actual target wireless station 120 location will be a random error, for example sometimes offset to the North, East, South, or West. The Levenberg-Marquardt method accounts for the CEP ellipse center being in error by sensing the random noise and adjusting the size of the 95% CEP ellipse accordingly.

Using a single wireless measuring station 410, the times of a series of TODs (i.e., TSFs) received from a target wireless station 120 can be recorded together with the TOA measurements. A synchronization function for the timer of the target wireless station 120 and the timer of the wireless measuring station 410 may be derived and used in the determination of the location of the target wireless station 120. However, such synchronization functions do not entirely eliminate systematic errors that can cause the actual location of the target wireless station 120 to fall outside of the resulting CEP ellipses.

Referring again to the drawing figures in which like reference designators refer to like elements, if there are systematic timing errors in the clocks, then, for an unknown amount of time, there is a consistent error in the measured position of the CEP ellipse relative to the actual location of the target wireless station 120 as calculated at the wireless measuring station 410.

When measured by the clock of the target wireless station 120, the TOD time (i.e., the TSF), t'TOD can be provided by equation (1):

$$t'_{TOD} = t + \alpha + \beta t. \tag{1}$$

In equation (1), t is the time measured using the clock of the wireless measuring station 410.

The TOF is then as provided by equation (2):

$$TOF = TOA - TOD = t_{TOA} - (t'_{TOD} + \alpha + \beta t). \tag{2}$$

Assuming that over a particular time span, the first and second order terms α and β deviate from their averages (i.e., α=α+Δα and β=β+Δβ), then equation (2) may be re-written as provided by equation (3):

$$TOF = TOD - TOA = t_{TOA} - [t'_{TOD} + (\alpha + \Delta\alpha) + (\beta t + \Delta\beta t)] \tag{3}$$
$$= t_{TOA} - [t'_{TOD} + \alpha + \beta t] - \Delta\alpha - \Delta\beta t.$$

The variance, or change compared to the model in equation (2), in the TOF (i.e., TOF$_{var}$), is provided by equation (4):

$$TOF_{var} = -\Delta\alpha - \Delta\beta t. \tag{4}$$

If the values of Δα and Δβ are maintained over a period of time shorter than the full time of the data fit, then this is considered a systematic timing error. The effect of such a systematic timing error on the calculated location of the target wireless station 120, is now discussed.

Figure 5:
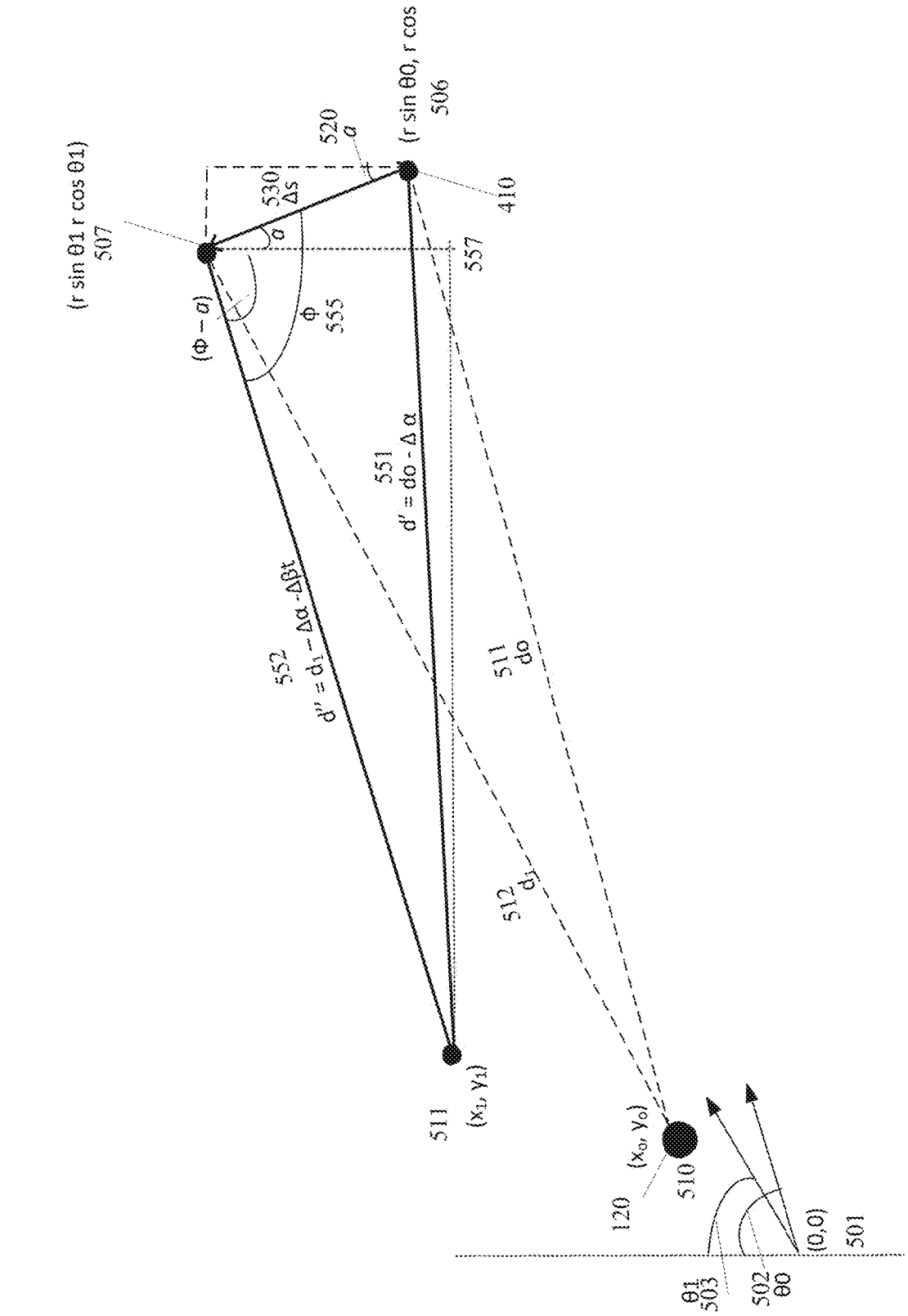
FIG. 5 is a schematic diagram of an exemplary target wireless station located at position (0,0) and a wireless measuring station that is orbiting at a radius r around the target wireless station, in accordance with some embodiments.

FIG. 5 is a schematic diagram of an example of a target wireless station 120 located at position (x₀, y₀) 510 and a wireless measuring station 410 that is orbiting at a radius r around the origin (0, 0) 501. At time t₀, TOD and TOA measurements are recorded by the wireless measuring station 410 at point 506 which corresponds to angle θ0 502, on the orbit. At time t₁ TOD and TOA measurements are recorded by the wireless measuring station 410 at point 507 which corresponds to angle θ1 503, on the orbit. Angles θ0 and θ1 are with respect to North. Points 506 and 507 are at a distance Δs 530 apart. If there are no systematic timing errors in the clocks, then at positions 506 and 507, wireless measuring station 410 would measure TOFs corresponding to the distances d₀ 511 and d₁ 512, respectively, provided by equations (5) and (6):

$$d_0 = \sqrt{(r\ \sin\ \theta 0 \pm x_0)^2 + (r\ \cos\ \theta 0 \pm y_0)^2}, \quad (5)$$

$$d_1 = \sqrt{(r\ \sin\ \theta 1 \pm x_0)^2 + (r\ \cos\ \theta 1 \pm y_0)^2}. \quad (6)$$

If there is a systematic timing error causing the TOFs to be shortened, then when wireless measuring station 410 is at position 506, the measured TOF will correspond to a shorter distance, d' 551, provided by equation (7):

$$d' = d_0 - \Delta\alpha \cdot c. \quad (7)$$

In equation (7), c is the speed of light.

Similarly, if there is a systematic timing error causing the TOFs to be shortened, then when wireless measuring station 410 is at position 507, the measured TOF will correspond to an even shorter distance d"552, provided by equation (8) (assuming $\Delta\beta$ is greater than 0):

$$d'' = d_1 - (\Delta\alpha + \Delta\beta(t_1 - t_0)) \cdot c. \quad (8)$$

These shortened TOFs result in the position of target wireless station 120 being calculated to be at location $(x_1, y_1)$ 511. The co-ordinates of location $(x_1, y_1)$ 511, may be calculated as follows.

Applying the cosine rule to the triangle formed by points 511, 506, and 507, angle $\Phi$ 555 can be determined as provided by equation (9):

$$d'^2 = d''^2 + \Delta s^2 - 2d''\Delta s\ \cos\ \Phi. \quad (9)$$

Equation (9) may be rearranged to solve for $\Phi$ 555, as shown by equation (10):

$$\Phi = ACOS(d''^2 + \Delta s^2 - d'^2)/2\ d''\Delta s. \quad (10)$$

Likewise, angle a 520 is provided by equation (11):

$$a = \text{ATAN}\left(\frac{r\ \sin\ \theta 0 - r\ \sin\ \theta 1}{r\ \cos\ \theta 0 - r\ \cos\ \theta 1}\right). \quad (11)$$

Using the right angle triangle formed by points 511, 557, and 507, the co-ordinates of location $(x_1, y_1)$ 511, are derived using equations (12) and (13):

$$x_1 = r\ \sin\ \theta 1 - d''\sin(\Phi - a), \quad (12)$$

$$y_1 = r\ \cos\ \theta 1 - d''\cos(\Phi - a). \quad (13)$$

FIGS. 6A, 6B, 6C, and 6D are example graphical representations of the calculated positions of the target wireless station 120, using equations (5) to (13) with the following conditions: (i) the orbiting speed of the wireless measuring station 410 is 150 kilometers per hour, (ii) the beacons are transmitted in 5 second intervals, (iii) the orbit radius r is 3000 meters, (iv) the starting location orbit angle $\theta 0$ of the wireless measuring station 410 is 60 degrees, (v) the ending location orbit angle $\theta n$ of the wireless measuring station 410 is −60 degrees, and (vi) the true location of target wireless station 120, $(x_0, y_0)$ 510, is at co-ordinates (400, 500).

Figure 6A:
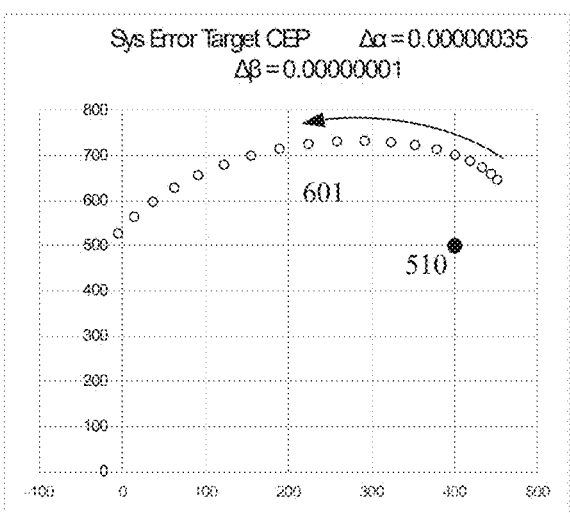
FIGS. 6A, 6B, 6C, and 6D are exemplary graphical representations of calculated positions of a target wireless station, in accordance with some embodiments.
Figure 6B:
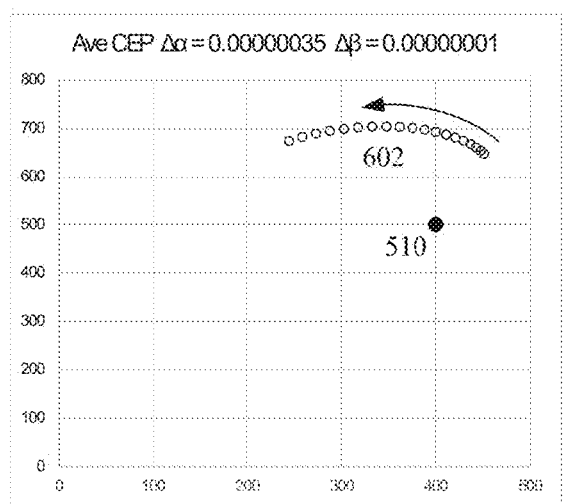

FIG. 6A depicts the calculated positions 601 of the target wireless station 120 when $\Delta\alpha = 3.50 \times 10^{-7}$ and $\Delta\beta = 1.0 \times 10^{-8}$. In this case, $\Delta\alpha$ and $\Delta\beta$ are both positive and, as discussed above with reference to equation (4), the TOFs will be shortened, resulting in the calculated positions 601 starting on the side closer to the position of the wireless measuring station 410 and moving in the same angular direction as the wireless measuring station 410 (i.e., anticlockwise) relative to the actual location of the target wireless station 120 at (400, 500) 510. Generally, the average of the individual positions 601 will be calculated and used as the calculated location(s). FIG. 6B is a graphical representation of the average positions 602 of the positions 601 shown in FIG. 6A.

Figure 6C:
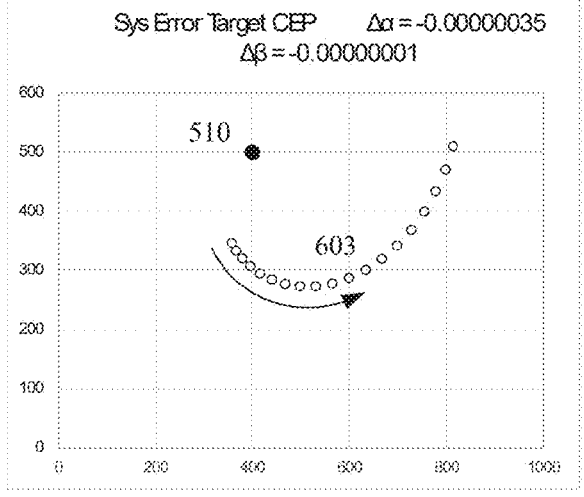
Figure 6D:
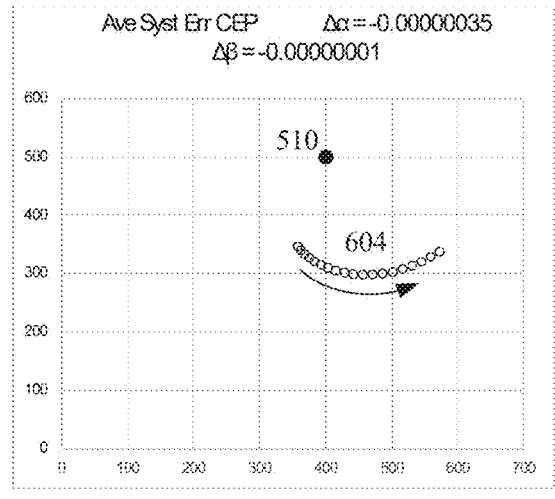

FIG. 6C depicts the calculated positions 603 of the target wireless station when $\Delta\alpha - 3.50 \times 10^{-7}$ and $\Delta\beta - 1.0 \times 10^{-8}$. In this case, $\Delta\alpha$ and $\Delta\beta$ are both negative and, as discussed above with reference to equation (4), the TOFs will be lengthened, resulting in the calculated positions 603 starting on the side opposite to the position of the wireless measuring station 410 but still moving in the same angular direction as the wireless measuring station 410 (i.e., anticlockwise), relative to the actual location of the target wireless station 120 at (400, 500) 501. FIG. 6D is a graphical representation of the average positions 604 of the positions 603 shown in FIG. 6C.

FIGS. 5, and 6A, 6B, 6C, and 6D show that systematic errors (i.e., when timing parameters $\Delta\alpha$ and $\Delta\beta$ have values that remain effectively constant over a period) cause the calculated locations of the target wireless station 120 to orbit its true location in the same direction that the wireless measuring station 410 is orbiting the target wireless station 120. The results of these figures and equations (5) to (13) demonstrate that if the TOFs are shortened, the calculated locations of the target wireless station 120 orbit the true location in phase with the wireless measuring station 410. If the TOFs are lengthened, the calculated locations of the target wireless station 120 orbit its true location 180 degrees out of phase (i.e., on the opposite side of the true location with respect to the wireless measuring station 410).

Figure 7:
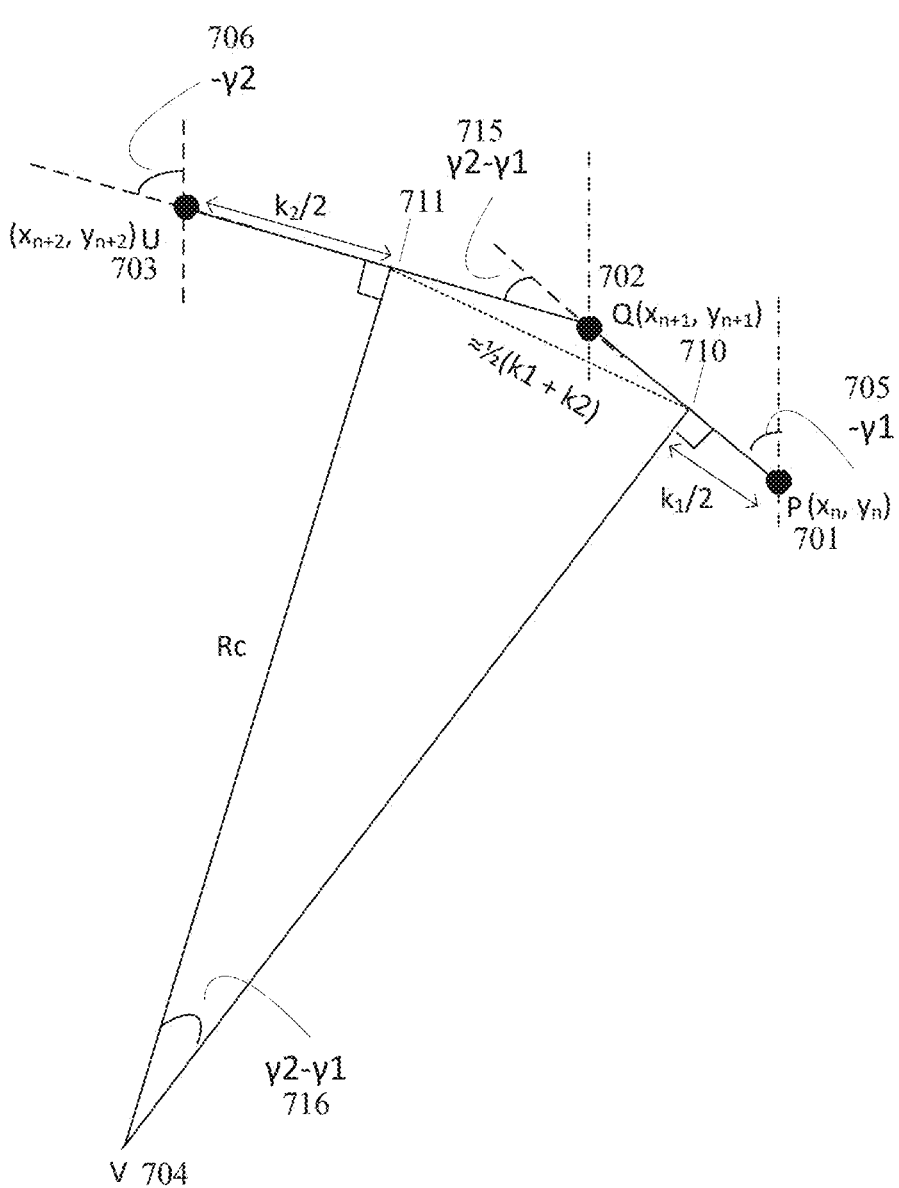
FIG. 7 is a schematic diagram of exemplary orbiting positions of a target wireless station that may be caused by a systematic error, in accordance with some embodiments.

FIG. 7 is a schematic diagram of an example of three calculated orbiting positions P 701, Q 702, and U 703 of the target wireless station 120, caused by a systematic error. In the example shown in FIG. 7, the direction from P 701 to Q 702 is at an angle of $-\gamma 1$ 705 with respect to North, and the direction from Q 702 to U 703 is at an angle of $-\gamma 2$ 706 with respect to North. The angle between them is $(\gamma 2 - \gamma 1)$ 715 which, in this example is a negative angle, representing that the angular direction is anticlockwise (i.e., the same direction as the orbiting wireless measuring station 410). The distance between points P 701 and Q 702 is $k_1$ and the distance between points Q 702 to U 703 is $k_2$. Point 710 is the center of the line joining points P 701 and Q 702. Point 711 is the center of the line joining points Q 702 and U 703. Two lines can be drawn from points 710 and 711 perpendicular to the lines joining points P 701 and Q 702, and points Q 702 and U 703, respectively. These lines intersect at point V 704. The distance between points 711 and V 704, Rc, is effectively the curvature radius of the orbiting positions P 701, Q 702, and U 703.

As the angle between the lines formed by point P 701 to point Q 702 and point Q 702 to point U 703 is $(\gamma 2 - \gamma 1)$ 715, the angle 716 at point V 704, subtended by lines 710 to 704 and 711 to 704, which are perpendicular to the other lines, is also ($\gamma2-\gamma1$). To a first approximation, the distance between lines 710 and 711 is ($k_1+k_2$)/2. Assuming ($\gamma2-\gamma1$) 716 is a small angle, to a first approximation the curvature radius Rc is provided by equation (14):

$$Rc = \frac{(k_1 + k_2)}{2(\gamma2 - \gamma1)}. \tag{14}$$

Systematic errors in the clock of the target wireless station 120 generally vary slowly in time. Fast fluctuations in the clock of the target wireless station 120 can be handled as random errors. The systematic errors in the clock of the target wireless station 120 result in CEP ellipses that generally do not encompass the true location of the target wireless station 120. As discussed above with reference to FIGS. 5 and 6, the motion of the centers of the calculated CEP ellipses, tracked over time, move in an orbit around the true location of the target wireless station 120 in the same angular direction as the wireless measuring station 410 is orbiting the target wireless station 120. By determining the orbital radii of the CEP ellipses resulting from systematic errors, the calculated 95% CEP ellipses can be increased in radius so as to encompass the actual location of the target wireless station 120. This increase in CEP ellipse radius is related to the distance of the wireless measuring station 410 to the actual location of the target wireless station 120. However, the actual location of the target wireless station 120 is not known.

Figure 8:
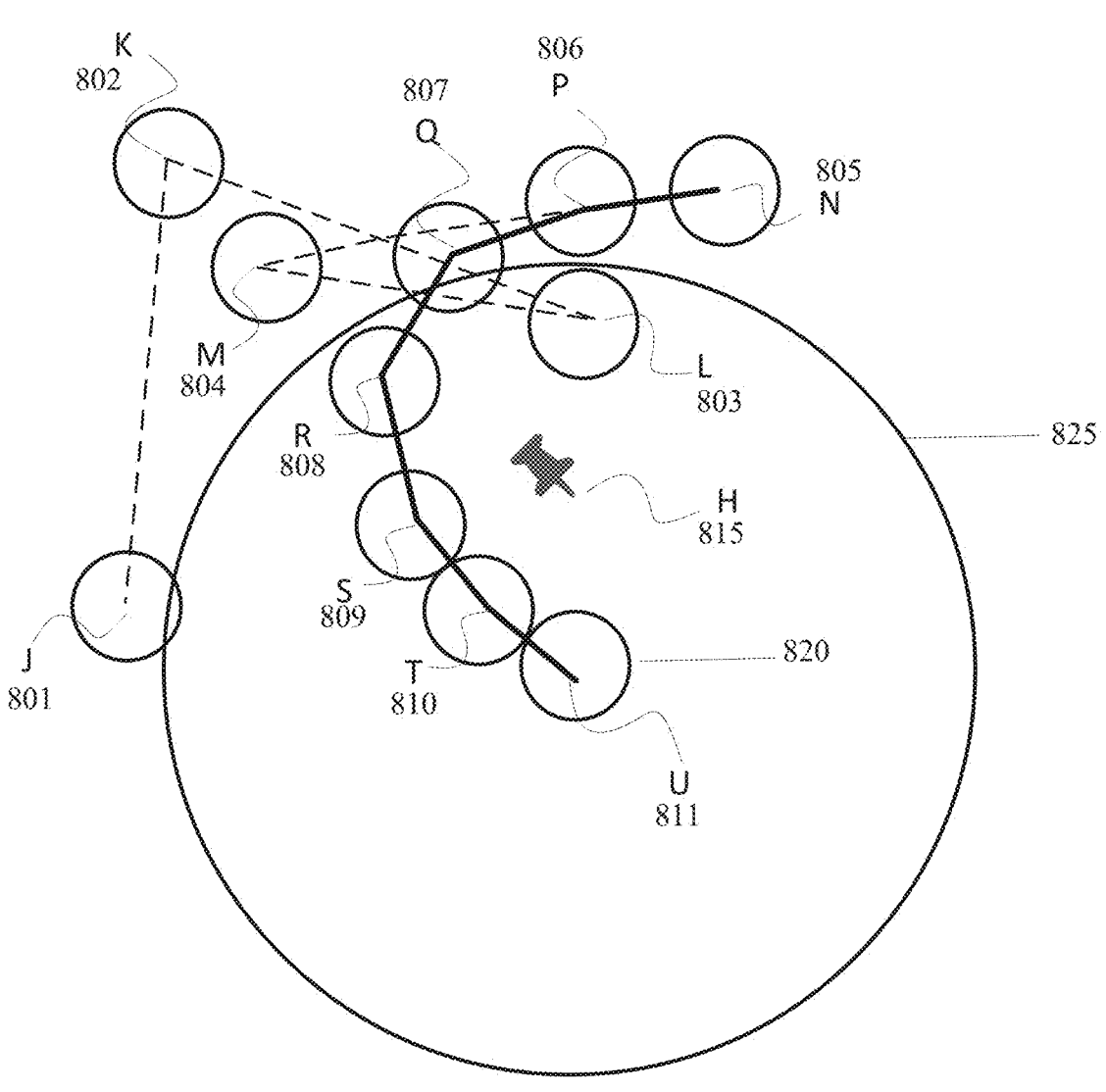
FIG. 8 is a diagram of exemplary passive location CEP ellipses using a single wireless measuring station as depicted in FIG. 4, in accordance with some embodiments.

FIG. 8 is an example of passive location CEP ellipses using a single wireless measuring station 410 as depicted in FIG. 4. In this example, the location of the target wireless station 120 is location 815. FIG. 8 depicts the area very close to the location of the target wireless station 120. As the wireless measuring station 410 orbits the target wireless station 120, the CEP ellipses are derived. In the example period depicted in FIG. 8, a CEP ellipse at position J 801 is derived, followed, in succession, by CEP ellipses at positions K 802, L 803, M 804, and N 805. These locations do not exhibit an orbital nature. However, the next set of CEP ellipses, namely P 806, Q 807, R 808, S 809, T 810, and U 811 do exhibit an orbital shape. In this example, the final calculated CEP ellipse 820 at location U 811 does not encompass the actual location of the target wireless station 120.

A method is disclosed herein to increase the area of the CEP ellipse 820 to the area of CEP ellipse 825 to encompass the actual location of the target wireless station 120 at location H 815, using the curvature radius characteristics of the CEP ellipse orbits.

Figure 9:
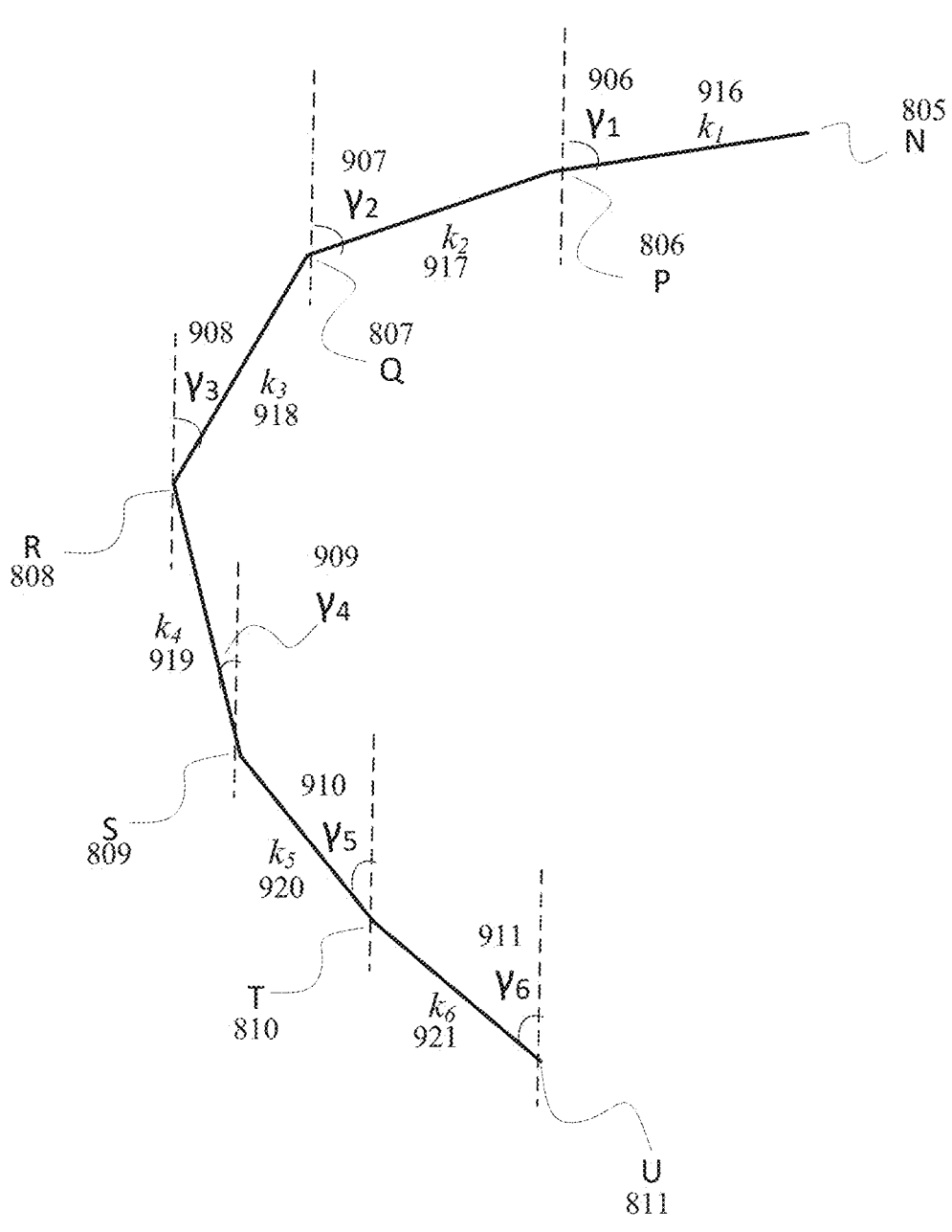
FIG. 9 is an illustration of the set of CEP ellipse locations of the CEP ellipses depicted in FIG. 8, in accordance with some embodiments.

FIG. 9 is an illustration of the set of CEP ellipse locations N 805, P 806, Q 807, R 808, S 809, T 810, and U 811 depicted in FIG. 8. As shown in FIG. 8, the set of CEP ellipses collectively exhibit an orbital shape. As each CEP ellipse is determined, the location (e.g., latitude and longitude) and the time/are recorded. For each CEP ellipse, the distance from the previous CEP ellipse and the angle or of the line joining the two CEPs, with respect to North, is also recorded. For example, when the CEP ellipse is at location P 806, distance $k_1$ 916 and angle $\gamma_1$ 906 are recorded together with time $t_1$. Similarly, as time progresses, at CEP locations Q 807, R 808, S 809, T 810, and U 811, distances $k_2$ 917, $k_3$ 918, $k_4$ 919, $k_5$ 920, $k_6$ 921, and angles $\gamma_2$ 907, $\gamma_3$ 908, $\gamma_4$ 909, $\gamma_5$ 910, $\gamma_6$ 911, are recorded together with their respective times, $t_2$ to $t_6$. At CEP ellipse location N 805, time $t_0$ is recorded together with the location. The radius of the curvatures, Rc, can be estimated using equation (14).

For each CEP ellipse location, $\Delta\gamma$ is the difference between the current angle $\gamma_n$ and the previous angle $\gamma_{n-1}$, and $k_{ave}$ is the average of the distances k between the last three CEP ellipse locations. For example, for CEP ellipse location Q 807:

$$\Delta\gamma_2 = (\gamma_2 - \gamma_1) \quad \text{and} \quad k_{ave2} = \frac{1}{2}(k_2 - k_1)$$

The terms $\gamma_n$ and $\gamma_{n-1}$ may be close to 0 (or 360) degrees (or $2\pi$ radians) causing errors in the term $\Delta\gamma_n$. This can be corrected as provided by equation (15):

$$\Delta\gamma_n = \text{SIN (ASIN}(\Delta\gamma_n)). \tag{15}$$

When the curvature radius Rc is calculated using equation (14), if the value of $\Delta\gamma_n$ is close to zero, then the calculated value of Rc may be very large and the next value of $\Delta\gamma_n$ may be twice that. To mitigate this, a minimum value $\Delta\gamma_{min}$ is used that is based on the orbital angle that wireless measuring station 410 has flown in the time $\Delta t$. In this context, $\Delta t$ is the time difference between the current and previous CEP ellipse locations. By way of example and not limitation, a preferred value for $\Delta\gamma_{min}$ is provided by equation (16):

$$\Delta\gamma_{min} = 2\pi(\Delta t)/T, \text{ where } T \text{ is the orbit time.} \tag{16}$$

The orbit time T may be determined after wireless measuring station 410 has completed one orbit and then updated thereafter for each orbit. Generally in passive geolocation techniques, no CEP ellipses are generally displayed before one orbit is completed because the $\alpha$ and $\beta$ timing parameters cannot be estimated until the wireless measuring station 410 has completed at least one orbit. Hence, the curvature radius Rc for CEP ellipse location n can be provided by equation (17):

$$Rc = \frac{1}{2}(k_n - k_{n-1})/\text{MAX }(\Delta\gamma_n, \Delta\gamma_{min}). \tag{17}$$

Generally, the displacement of the CEP ellipses may switch back and forth from random displacements to displacements that reflect systematic errors with periods of the orbit corresponding to periods when the timers behave according to the model (i.e., linear changes in the drift), versus periods when the timers drift nonlinearly. The disclosed method looks at the average of the displacement radius Rc at the times when the displacements correspond to systematic errors, and where the CEP ellipses exhibit an orbiting behavior. Moreover, the disclosed method looks at CEP ellipse orbiting behavior in the same angular direction as the orbit of the wireless measuring station 410 (i.e., in an anticlockwise sense if the orbit is anticlockwise, as shown in FIGS. 4 and 5, and vice versa). As discussed above with reference to FIG. 7, if the difference angle $\Delta\gamma$ 715 is negative, then the CEP ellipses are orbiting anticlockwise, and if the difference angle $\Delta\gamma$ 715 is positive, then the CEP ellipses are orbiting clockwise.

If the difference angle $\Delta\gamma$ 715 is greater than a value $N \cdot \Delta\gamma_{min}$, then the calculated CEP ellipse location changes can be assumed to be due to noise or Gaussian fluctuations. By way of example and not limitation, a value of N=3 may be used. In addition, the CEP ellipses must not be too far apart (i.e., they must have displacements that occurred relatively close in time). A maximum time separation between CEP ellipses can be set as a fraction of the orbit time T, i.e., T/M. By way of example and not limitation, a value of M=16 may be used. Having calculated a value for the average displacement radius $Rc_{ave}$ to increase the possibility of including the actual location of the target wireless station 120, the radius of CEP 820 may be increased to encompass the actual location of target wireless station 120 at location H 815, (i.e., CEP ellipse 825). The radius of the CEP ellipse 825 may be set to a multiple P of the average displacement radius $P \times Rc_{ave}$. By way of example and not limitation, a value of P=3 may be used.

Figure 10:
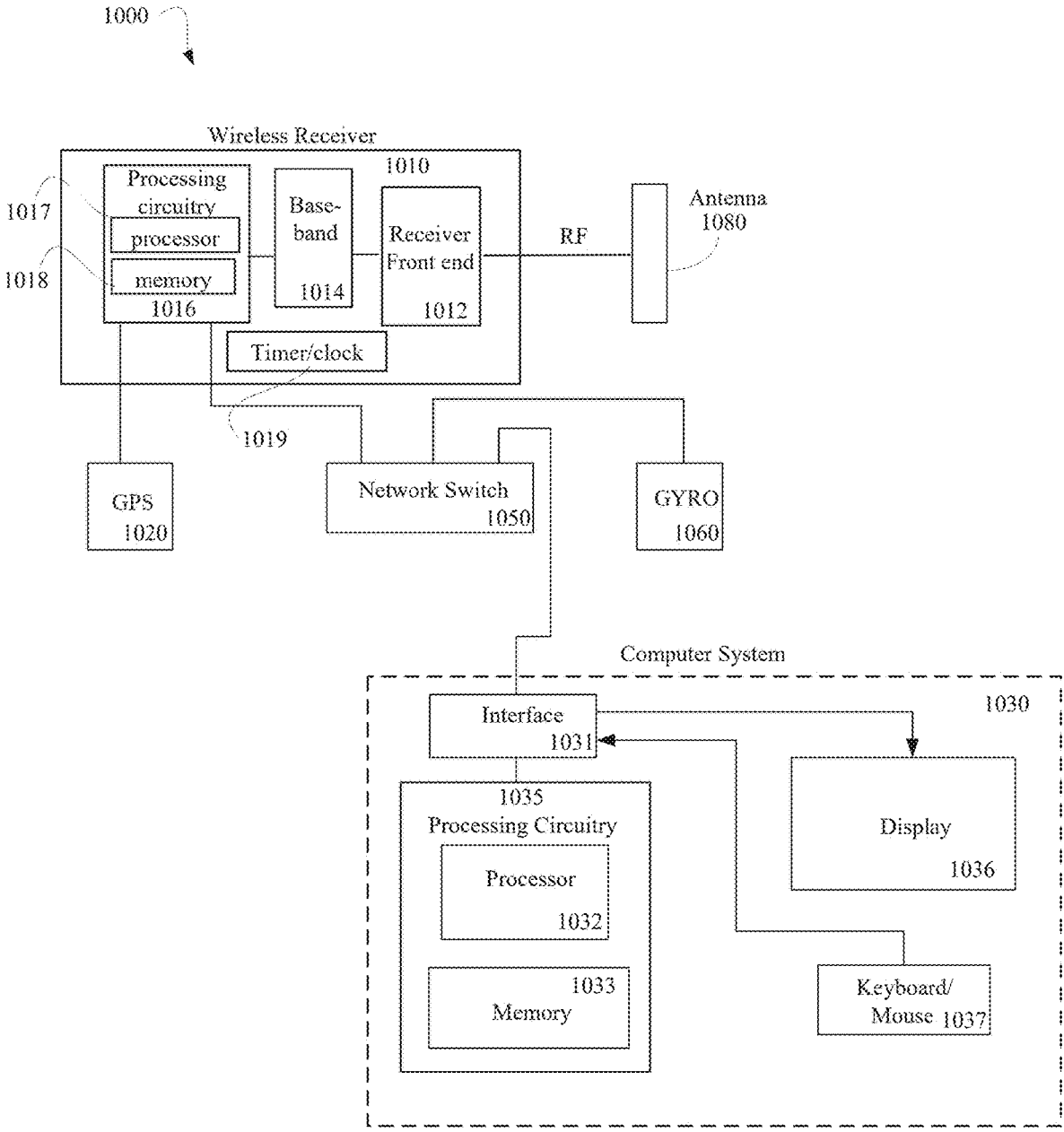
FIG. 10 is a block diagram of an exemplary wireless measuring receiver, in accordance with some embodiments.

FIG. 10 is a block diagram of an example of a wireless measuring receiver 1000, which, according to an embodiment of the disclosure, may be used as, or as part of, the wireless measuring station 410. Wireless measuring receiver 1000 may be any device capable of wirelessly receiving signals based upon the IEEE 802.11 specification and may be configured to execute any of the methods illustrated in the present disclosure. It may be a station, an access point, or the like. In some embodiments described herein, wireless measuring receiver 1000 further includes an antenna 1080, a wireless receiver 1010, a computer system 1030, a global positioning system (GPS) 1020, a gyroscope 1060, and a network switch 1050 such as an Ethernet switch.

Wireless receiver 1010 may receive radio frequency (RF) signals from antenna 1080. The output of the GPS 1020 may be connected to wireless receiver 1010 and may provide the latitude, longitude, altitude, and velocity of the wireless measuring receiver 1000. Wireless receiver 1010 may append GPS information to any RF reception (e.g., beacons). Network switch 1050 may be connected to wireless receiver 1010, gyroscope 1060, and computer system 1030.

In some embodiments described herein, wireless receiver 1010 includes receiver front end 1012, baseband unit 1014, processing circuitry 1016, and timer/clock 1019. Receiver front end 1012 may be operable to perform functions of an RF receiver front end such as low noise amplification, filtering, and frequency down conversion so as to condition the received signal suitable for inputting to baseband unit 1014. Baseband unit 1014 may be operable to perform functions of a baseband unit or processor, such as demodulation, descrambling, and error correction of received packets as described in the IEEE 802.11 Standard. Processing circuitry 1016 may include processor 1017 and memory 1018. In addition to a traditional processor and memory, processing circuitry 1016 may comprise integrated circuitry for processing and/or control (e.g., one or more processors, processor cores, Field Programmable Gate Arrays (FPGAs), and/or Application Specific Integrated Circuits (ASICs)). Processor 1017 may be configured to access (e.g., write to and/or reading from) memory 1018, which may comprise any kind of volatile and/or non-volatile memory (e.g., cache and/or buffer memory, Random Access Memory (RAM), Read-Only Memory (ROM), optical memory, and/or Erasable Programmable Read-Only Memory (EPROM)). Such memory 1018 may be configured to store code executable by processor 1017 and/or other data (e.g., data pertaining to communication, configuration and/or address data of nodes, etc.).

Processing circuitry 1016 may be configured to control any of the methods and/or processes described herein and/or to cause such methods and/or processes to be performed (e.g., by wireless measuring station 410). Corresponding instructions may be stored in memory 1018, which may be readable and/or readably connected to processor 1017. In other words, processing circuitry 1016 may comprise a microprocessor, a microcontroller, an FPGA device, and/or an ASIC device. The GPS information may be provided to processing circuitry 1016 by GPS 720. RF receptions (e.g., beacons) may have GPS information added such that the position of the wireless measuring receiver 1000 is known for each received signal. The GPS information, together with information related to the received signals, may be sent to the network switch 1050 and thus made available to the computer system 1030. In some embodiments, network switch 1050 is an Ethernet switch.

Computer system 1030 may include interface 1031. Interface 1031 may contain an Ethernet connection to the network switch 1050, a connection to a display 1036, a connection to a keyboard and mouse 1037 as well as interfacing to processing circuitry 1035. According to some embodiments of this disclosure, processing circuitry 1035 may include processor 1032, and memory 1033. Memory 1033 may contain the ground mapping information of the area of interest and processor 1032 and memory 1033 may be used to carry out all or part of the exemplary processes as described in this disclosure. The processor 1032 and memory 1033 may be used to carry out processes for the geo-location of the target wireless station 120, using the TOD and TOA times as reported by processing circuitry 1016 in the wireless receiver 1010, information on the position of the measuring station 410 derived from GPS 1020 and gyro 1060, plus information on the target wireless station 120 which may be inputted using the keyboard and mouse 1037. Display 1036 may be used to show the ground map together with the estimated location of target wireless stations 120 in the form of CEP ellipses with centers.

Note that the modules discussed herein may be implemented in hardware or a combination of hardware and software. For example, the modules may be implemented by a processor executing software instructions or by application specific integrated circuitry configured to implement the functions attributable to the modules. Also note that the term "connected to" as used herein refers to "being in communication with" and is not intended to mean a physical connection nor a direct connection. It is contemplated that the signal path between one element and another may traverse multiple physical devices.

According to an embodiment of the disclosure, processing circuitry 1035 may include the memory 1033 and a processor 1032, the memory 1033 containing instructions which, when executed by the processor 1032, configure the processor 1032 to perform the one or more functions described herein. In addition to a traditional processor and memory, the processing circuitry 1035 may comprise integrated circuitry for processing and/or control (e.g., one or more processors, processor cores, FPGAs, and/or ASICs).

Processing circuitry 1035 may include and/or be connected to and/or be configured for accessing (e.g., writing to and/or reading from) the memory 1033, which may include any kind of volatile and/or non-volatile memory (e.g., cache memory, buffer memory, RAM, ROM, optical memory, and/or EPROM). Such memory 1033 may be configured to store code executable by control circuitry and/or other data (e.g., data pertaining to communication, configuration and/or address data of nodes, etc.). Processing circuitry 1035 may be configured to control any of the methods described herein and/or to cause such methods to be performed (e.g., by processor 1032). Corresponding instructions may be stored in memory 1033, which may be readable and/or readably connected to the processing circuitry 1035. In other words, the processing circuitry 1035 may include a controller, which may comprise a microprocessor, microcontroller, FPGA device, and/or ASIC device. It may be considered that the processing circuitry 1035 includes or may be connected or connectable to memory, which may be configured to be accessible for reading and/or writing by the controller and/or processing circuitry 1035.

According to an embodiment of the disclosure, wireless measuring receiver 1000 may be configured to receive transmissions of a target wireless station 120 and processing circuitry 1016 may be configured to monitor an attribute of the beacon transmissions of target wireless station 120 and determine the value of the TSF field in the beacons. In addition, according to an embodiment of the disclosure, wireless receiver 1010 may be configured to measure the TOAs of the received beacon transmissions of target wireless station 120. This may be accomplished by outputting the value of the TSF timer, or another internal timer/clock 1019, of the wireless measuring receiver 1000 that corresponds to a precise point in time when the beacon was received. In some embodiments, this point in time may correspond to the time when the frame check is completed. In some embodiments, the point in time may be taken at various other points in the received beacon, for example the time when the clear channel assessment (CCA) of wireless measurement receiver 1000 was exerted by the beacon reception, or the point where the header of the beacon is verified. This timing may also be accomplished by outputting a trigger that is timed to coincide with the reception of the beacon from target wireless station 120. This trigger may correspond to any known point within the reception of the beacon. This trigger may then be used to read the time from the internal timer/clock 1019. Timer/clock 1019 may have a precision that is higher than the internal TSF timer that is part of the processing circuitry 1016.

According to another embodiment of the disclosure, computer system 1030 may be connected to wireless receiver 1010. Computer system 1030 may be a computer system with an associated display module such as a laptop or tablet computer or may be a computer system with a separate display monitor. Computer system 1030 may be used as an operator interface for wireless measuring receiver 1000 and to display the location of target wireless stations 120 on a digital grid or map. The calculations described in this disclosure may be performed using software in the processing circuitry 1035, the required timing information being provided by an interconnection link with wireless receiver 1010.

According to an embodiment of the disclosure, wireless measuring receiver 1000 is configured to receive a plurality of beacons from a target wireless station 120, and processing circuitry 1016, including a memory 1018 and a processor 1017, the memory 1018 in communication with the processor 1017, the memory 1018 having instructions that, when executed by the processor 1017, configure the processor 1017 to perform a variety of tasks. In one embodiment, these tasks include identifying a plurality of TODs of a corresponding plurality of beacons received at wireless measuring receiver 1000, each of the plurality of TODs indicating when the target wireless station 120 transmitted a beacon to the wireless measuring receiver 1000 according to a timer associated with the target wireless station 120, identifying a plurality of TOAs corresponding to the plurality of beacons at the wireless measuring station 410 according to a timer/clock 1019 associated with the wireless measuring receiver 1000, and synchronizing the timer associated with the target wireless station 120 with the timer/clock 1019 associated with the wireless measuring receiver 1000 (i.e., the wireless measuring station 410).

The synchronizing of the timers includes applying an offset factor α for aligning the timer associated with the wireless measuring station 410 when the wireless measuring station 410 receives the plurality of beacons and applying a factor β for correcting a ratio of timer rates between the timer associated with the target wireless station 120 and the time/clock 1019 associated with the wireless measuring station 410. The synchronization may further include applying a factor γ for correcting the changes in the ratio of frequency drifts in the timer associated with the target wireless station 120. Processor 1017 may be further configured to determine a plurality of TOFs corresponding to the plurality of beacons, the plurality of TOFs based at least in part upon the plurality of TODs, the plurality of TOAs, and the synchronization of the timer associated with the target wireless station 120 and the timer/clock 1019 associated with the wireless measuring station 410, and to determine a location of the target wireless station 120 based at least in part on the determined plurality of TOFs, and the synchronization of the timer associated with the target wireless station 120 and the timer/clock 1019 associated with the wireless measuring station 410. According to an embodiment of the disclosure, the processing circuitry 1035 may be used either in place of, or together with, the processing circuitry 1016 for the synchronization of the timers and calculations of the TOFs. The plurality of TOFs, together with the location information of the wireless measuring station 410 for each TOF, may then be used to calculate a location for the target wireless station 120. The location may comprise a CEP ellipse with a center. A new CEP ellipse may be calculated for every reception of a beacon or at intervals when a number of beacons have been received. Such calculations may take place in processing circuitry 1016 in the wireless receiver 1010 and/or the processing circuitry 1035 in the computer system 1030. Furthermore, as discussed above with reference to FIGS. 5, 6, 7, and 8, the CEP ellipse locations may be examined to establish if they exhibit an orbital characteristic, and if so, further calculations may be performed by the computer system 1030 and/or the processing circuitry 1035 to determine a suitable radius for the 95% CEP ellipse that is displayed on a ground map via display 1036.

Figure 11:
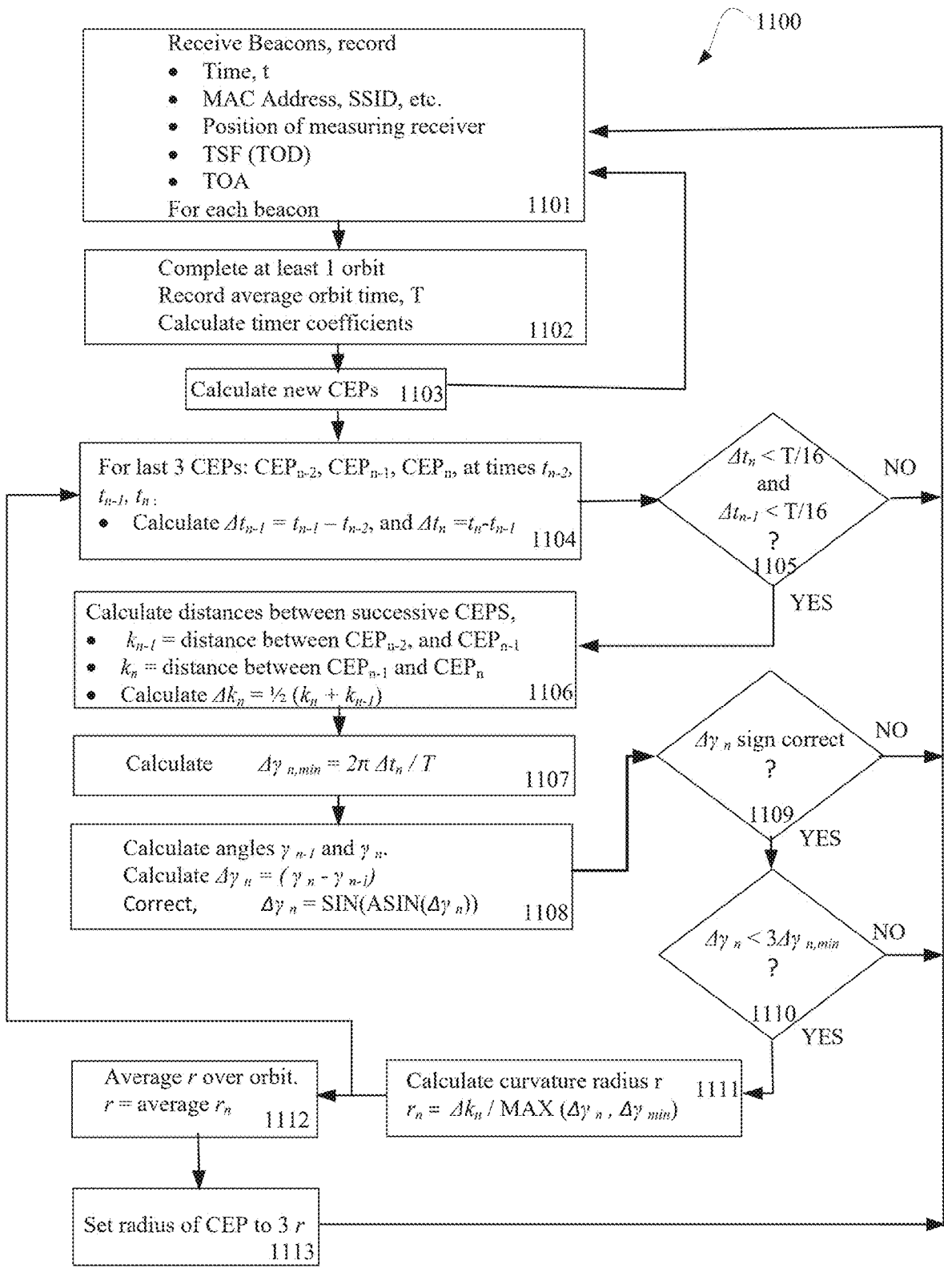
FIG. 11 is a flowchart of a process that examines the calculated individual CEP ellipses for a target wireless station to determine if the CEP ellipses exhibit an orbital characteristic and to calculate a CEP ellipse curvature radius/radii, in accordance with some embodiments.

FIG. 11 is a flowchart of an example process 1100 that examines the calculated individual CEP ellipses for a target wireless station 120 to determine if the CEP ellipses exhibit an orbital characteristic and, if an orbital characteristic is exhibited, to calculate the CEP ellipse curvature radius/radii accordingly.

Process 1100 may start at step 1101, where wireless measuring station 410 is flying in an orbit and receiving beacons from several target wireless stations 120. As wireless measuring station 410 continues around the orbit, beacons from different target wireless stations 120 may be received at different points in the orbit. As each beacon is received, wireless measuring station 410 may record (i) the time t, (ii) details of the beacon such as medium access control (MAC) address and service set identifier (SSID), (iii) the position of the wireless measuring station 410, (iv) the TSF of the beacon, and (v) the TOA. The beacons may be received via antenna 1080, receiver front end 1012, decoded by baseband unit 1014, and the details stored in memory 1018. Processing circuitry 1016 may perform the timing in co-operation with timer/clock 1019.

At step 1102 wireless measuring station 410 checks if beacons have been received from a particular target wireless station 120 for at least one orbit. This check may be performed by processing circuitry 1016 and/or computer system 1030. The orbit time T may be recorded. Orbit time T may be determined by processing circuitry 1035 using information from the GPS 1020 and stored in memory 1033. Beacons are received from a target wireless station 120 that are separated in time, but when wireless measuring station 410 is at the same, or a close by, position (i.e., the beacons are separated by at least one orbit), then the timing drift parameters (e.g., $\alpha$ and $\beta$) between the clock of that particular target wireless station 120 and the timer of the wireless measuring station 410 may be estimated and used to calculate the set of TOFs of all beacons received in that orbit. The timer drift calculation may be performed by processing circuitry 1035 in computer system 1030.

At step 1103, a CEP ellipse may be calculated for that target wireless station 120. The CEP ellipse calculation may be performed by computer system 1030. The reception of beacons is continuous and steps 1101, 1102, and 1103 continue to take place as wireless measuring station 410 orbits the target wireless stations 120. New CEP ellipses for each target wireless station 120 continue to be generated at intervals that may be set by time and/or availability or number of beacons from any wireless station 120. In some embodiments, new CEP ellipses for individual target wireless stations 120 may be generated between 5 and 20 seconds apart.

At steps 1104 to 1110, the last three CEP ellipses generated for a particular target wireless station 120 at step 1103 are examined to determine if they display a curvature radius Rc, as discussed above with reference to FIGS. 5 and 6. These calculations may be performed by computer system 1030 reading information stored in memory 1018 and/or 1033.

At step 1104, the times $t_{n-2}$, $t_{n-1}$, $t_n$ are noted for the last three CEP ellipses: $CEP_{n-2}$, $CEP_{n-1}$, $CEP_n$ respectively. The time differences $\Delta t_{n-1}$ and $\Delta t_n$ are then calculated as shown below in equations (18) and (19), respectively:

$$\Delta t_{n-1} = t_{n-1} - t_{n-2}, \tag{18}$$

$$\Delta t_n = t_n - t_{n-1}. \tag{19}$$

At step 1105, a check is carried out to establish that the time differences between the CEP ellipses is not too large. For example, a time difference related to the orbit time may be used. By way of example and not limitation, if $\Delta t_{n-1} > T/16$ or $\Delta t_n > T/16$, then the time differences are considered too large and the process returns to step 1101. If $\Delta t_{n-1} < T/16$ and $\Delta t_n < T/16$, then at step 1106 the distances $k_{n-1}$ and $k_n$ and the difference, $\Delta k_n$, are calculated as shown below in equation (20):

$$k_{n-1} = \text{distance between } CEP_{n-2}, \text{ and } CEP_{n-1} \tag{20}$$

$$k_n = \text{distance between } CEP_{n-1} \text{ and } CEP_n \text{ and } \Delta k_n = 1/2 \ (k_n - k_{n-1}).$$

To avoid values of $\Delta\gamma$ that are close to zero and would result in large values for the curvature radius Rc, at step

1107, a value for $\Delta\gamma_{min}$ that is related to the orbit time may be used. By way of example and not limitation, a value for $\Delta\gamma_{min}$ is provided by equation (16).

At step 1108, as discussed above with reference to FIG. 7, angle $\gamma_{n-1}$ between the line joining $CEP_{n-1}$ and $CEP_{n-2}$, and angle $\gamma_n$ between the line joining $CEP_n$ and $CEP_{n-1}$, are both calculated, with respect to North. The difference $\Delta\gamma_n = (\gamma_n - \gamma_{n-1})$ is then calculated. To correct for angles close to 0 and $2\pi$, the value for $\Delta\gamma_n$ is adjusted using equation (15).

At step 1109, the sign of $\Delta\gamma_n$ is examined to check that the angular direction of the CEP ellipses is the same as the angular direction of the orbit of the wireless measuring station 410. As discussed above with reference to FIG. 7, if the sign of $\Delta\gamma_n$ is negative then the angular direction of the CEP ellipses is anticlockwise. If the sign of $\Delta\gamma_n$ is not correct, then the process returns to step 1101.

At step 1110 the values of $\Delta\gamma_n$ and $\Delta\gamma_{n-1}$ are checked to ensure that they are not too large. By way of example and not limitation, if $\Delta\gamma_n > 3 \cdot \Delta\gamma_{min}$, then the angle difference is considered too large, and the process returns to step 1101. If $\Delta\gamma_n < 3 \cdot \Delta\gamma_{min}$, then at step 1111 the curvature radius $Rc_n$ is calculated as provided by equation (17), or by equation (21) below:

$$Rc_n = \Delta k_n / \text{MAX} \ (\Delta\theta_n, \Delta\theta_{min}). \tag{21}$$

The process may then return to step 1104, to check the next set of three CEP ellipses. At step 1112, the values for Rc over the past full orbit may be averaged to provide $Rc_{ave}$ and then at step 1113, the radius of the last CEP ellipse may be set to $3 \cdot Rc_{ave}$.

Process 1100 describes the calculations for sets of CEP ellipses related to one target wireless station 120. Generally, when measuring geo-location passively, beacons from many target wireless station 120 may be received. Process 1100 may be performed for each of the target wireless stations 120 from which beacons are received. Dependent upon where in the orbit of the wireless measuring station 410 beacons are received, each completed orbit corresponding to a target wireless station 120 may start and stop in different positions. At step 1105, the maximum value for $\Delta t$ may be set at T/16. It should be appreciated that this value was derived experimentally, and other values may be used for $\Delta t$. At step 1110 a maximum value for $\Delta\theta$ is set at $3 \cdot \Delta\theta_{min}$, and again this value was derived experimentally, and other values may be used for $\Delta\theta$. At step 1113 the radius of the CEP ellipse is set to $3 \cdot Rc_{ave}$. The requirement is to adjust the CEP ellipse radius such that the actual location of the target wireless station 120 is encompassed. A value of $3 \cdot Rc_{ave}$ was derived experimentally but other values may be used.

Some Embodiments

Some embodiments may include any of the following:

A1. A method for operating a measuring station that is orbiting a target wireless station to generate a circular error probability (CEP) ellipse that encompasses the location of the target wireless station including receiving, at the measuring station, a plurality of beacons transmitted by the target wireless station; identifying a plurality of Time of Departures (TODs) and a plurality of Time of Arrivals (TOAs) corresponding to the plurality of beacons; determining a plurality of Times of Flight (TOFs) corresponding to the plurality of beacons based on the plurality of TODs and the plurality of TOAs; calculating a plurality of CEP ellipses for the target wireless station based, at least in part, on the plurality of TOFs; determining whether the plurality of CEP ellipses exhibit an orbital radius; in response to determining that the plurality of CEP ellipses do exhibit an orbital radius, calculating a curvature radius of the plurality of CEP ellipses; and generating an adjusted CEP ellipse encompassing a location of the target wireless station based on the curvature radius of the plurality of CEP ellipses.

A2. The method of clause A1 can include any of the following components or features, in any combination. Identifying the plurality of TODs includes retrieving, from each of the plurality of beacons, a time of transmission determined by a timer associated with the target wireless station. Identifying the plurality of TOAs includes determining, for each of the plurality of beacons, an arrival time using a timer associated with the measuring station. The method includes, in response to determining that the target wireless station has completed at least one orbit, synchronizing the timer associated with the target wireless station with the timer associated with the measuring station, wherein determining the plurality of TOFs corresponding to the plurality of beacons based on the plurality of TODs and the plurality of TOAs includes determining the plurality of TOFs based on the synchronization of the timer associated with the target wireless station and the timer associated with the measuring station. Determining whether the plurality of CEP ellipses exhibit an orbital radius includes recording a time t for each CEP ellipse; and for each consecutive pair of CEP ellipses, calculating an angle $\gamma$ of a reference line connecting the pair of CEP ellipses. The method includes calculating a time difference value between the times t for a consecutive pair of CEP ellipses; comparing the time difference value to a time difference threshold; in response to the time difference value being less than the time difference threshold, proceeding with the orbital radius determination; and in response to the time difference value being greater than the time difference threshold, forgoing the orbital radius determination. The method includes calculating an angle difference value between a first angle $\gamma_1$ corresponding to a first and second CEP ellipse and a second angle $\gamma_2$ corresponding to the second CEP ellipse and a third CEP ellipse; comparing the angle difference value to an angle difference threshold; in response to the angle difference value being less than the angle difference threshold, proceeding with the orbital radius determination; and in response to the angle difference value being greater than the angle difference threshold, forgoing the orbital radius determination. The method includes determining an angular direction of the plurality of CEP ellipses; comparing a sign of the angle difference value to the angular direction of the plurality of CEP ellipses; in response to the sign of the angle difference value matching the angular direction of the plurality of CEP ellipses, proceeding with the orbital radius determination; and in response to the sign of the angle difference value not matching the angular direction of the plurality of CEP ellipses, foregoing the orbital radius determination. The method includes calculating an average distance value using a first distance $k_1$ between the first and second CEP ellipses and a second distance $k_2$ between the second CEP and third CEP ellipses; and calculating the curvature radius of the plurality of CEP ellipses based on the angle difference value and the average distance value. The method includes calculating an angle minimum value based on an orbit period of the target wireless station and the time difference, wherein (i) the angle difference threshold corresponds to a multiple of the angle minimum value and (ii) calculating the curvature radius of the plurality of CEP ellipses based on the angle difference value and the average distance value further includes calculating the curvature radius based on the angle minimum value. Generating the adjusted CEP ellipse based on the curvature radius of the plurality of CEP ellipses includes generating the adjusted CEP ellipse with a radius corresponding to a multiple of the curvature radius.

A3. A measuring station configured to generate a circular error probability (CEP) ellipse that encompasses the location of a target wireless station including at least one memory device with computer-executable instructions stored thereon; and at least one processor for executing the computer-executable instructions stored on the at least one memory device. Execution of the computer-executable instructions by the at least one processor causes the at least one processor to perform operations including receiving a plurality of beacons transmitted by a target wireless station; identifying a plurality of Time of Departures (TODs) and a plurality of Time of Arrivals (TOAs) corresponding to the plurality of beacons; determining a plurality of Times of Flight (TOFs) corresponding to the plurality of beacons based on the plurality of TODs and the plurality of TOAs; calculating a plurality of CEP ellipses for the target wireless station based, at least in part, on the plurality of TOFs; determining whether the plurality of CEP ellipses exhibit an orbital radius; in response to determining that the plurality of CEP ellipses do exhibit an orbital radius, calculating a curvature radius of the plurality of CEP ellipses; and generating an adjusted CEP ellipse encompassing a location of the target wireless station based on the curvature radius of the plurality of CEP ellipses.

A4. A method in a measuring station that is orbiting a wireless device, the measuring station configured to receive a plurality of beacons from the wireless device and display a circular error probability ellipse (CEP) that encompasses the location of the wireless device even if there are systematic errors in the measurement. The method includes identifying a plurality of Time of Departures (TODs) of a corresponding plurality of beacons received at a measuring station, each of the plurality of TODs indicating when the wireless device transmitted a beacon to the measuring station according to a timer associated with the wireless device; identifying a plurality of Time of Arrivals (TOAs) corresponding to the plurality of beacons at the measuring station according to a timer associated with the measuring station; after at least 1 orbit, synchronizing the timer associated with the wireless device with the timer associated with the measuring station; determining a plurality of Times of Flight (TOFs) corresponding to the plurality of beacons, the plurality of TOFs based at least in part upon the plurality of TODs, the plurality of TOAs, and the synchronization of the timer associated with the wireless device and the timer associated with the measuring station; calculating the orbit period, T; calculating the second order and higher relative drift of the timers; calculating circular error probability (CEP) ellipses and recording time t for each CEP ellipses; calculating the distances k between successive CEP ellipses; calculating the angles $\gamma$ of the lines connecting the successive CEP ellipses with respect to north; determining if the CEP ellipses exhibit an orbital radius, and if so, calculating the average orbital radii $Rc_{ave}$ of the CEP ellipse; and setting the radius of displayed CEP ellipse based upon the calculated value of the average orbital radius $Rc_{ave}$.

A5. The method of clause A4 can include any of the following components or features, in any combination. The method includes calculating the difference $\Delta t$ in distances t; calculating a difference $\Delta k$ in distances k; calculating the difference $\Delta \gamma$ in angles $\gamma$; determining if the CEP ellipses exhibit an orbital radius by: checking that Δt is less than a preset maximum value; and checking that Δγ is less than a preset maximum value. A minimum value for Δγ is set based on the time differences of the derivation of the CEP ellipses and the orbit time. The orbital radius Rc is calculated as a ratio of Δs and Δγ. The radius of the CEP ellipse is set according to a multiple of the average value of Rc over an orbit.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the factors used to determine the maximums for Δt and Δθ, the multiplier of the calculated radius Rc used to set the CEP ellipse radius, the details of the timing corrections, the value of the minimum Δθ, the details of CEP ellipse calculations and when CEP ellipses are calculated. Accordingly, the scope should be determined not by the embodiments illustrated, but by the claims and embodiments.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope.

What is claimed is:

1. A method for operating a measuring station to generate a circular error probability (CEP) ellipse that encompasses the location of a target wireless station, the method comprising:
   receiving, at a measuring station, a plurality of beacons transmitted by a target wireless station;
   identifying a plurality of Time of Departures (TODs) and a plurality of Time of Arrivals (TOAs) corresponding to the plurality of beacons;
   determining a plurality of Times of Flight (TOFs) corresponding to the plurality of beacons based on the plurality of TODs and the plurality of TOAs;
   calculating a plurality of CEP ellipses for the target wireless station based, at least in part, on the plurality of TOFs;
   determining whether the plurality of CEP ellipses exhibit an orbital radius;
   in response to determining that the plurality of CEP ellipses exhibit an orbital radius, calculating a curvature radius of the plurality of CEP ellipses; and
   generating, based on the curvature radius of the plurality of CEP ellipses, an adjusted CEP ellipse encompassing a location of the target wireless station.

2. The method of claim 1, wherein identifying the plurality of TODs comprises retrieving, from each of the plurality of beacons, a time of transmission determined by a timer associated with the target wireless station, and identifying the plurality of TOAs comprises determining, for each of the plurality of beacons, an arrival time using a timer associated with the measuring station.

3. The method of claim 2, further comprising:
   in response to determining that the target wireless station has completed at least one orbit, synchronizing the timer associated with the target wireless station with the timer associated with the measuring station,
   wherein determining the plurality of TOFs corresponding to the plurality of beacons based on the plurality of TODs and the plurality of TOAs further comprises determining the plurality of TOFs based on the synchronization of the timer associated with the target wireless station and the timer associated with the measuring station.

4. The method of claim 1, wherein determining whether the plurality of CEP ellipses exhibit an orbital radius comprises:
   recording a time t for each CEP ellipse; and for each consecutive pair of CEP ellipses, calculating an angle $\gamma$ of a reference line connecting the pair of CEP ellipses.

5. The method of claim 4, further comprising:
calculating a time difference value between times t for a consecutive pair of CEP ellipses;
comparing the time difference value to a time difference threshold;
in response to the time difference value being less than the time difference threshold, proceeding with the orbital radius determination; and
in response to the time difference value being greater than the time difference threshold, forgoing the orbital radius determination.

6. The method of claim 5, further comprising:
calculating an angle difference value between a first angle $\gamma_1$ corresponding to a first and second CEP ellipse and a second angle $\gamma_2$ corresponding to the second CEP ellipse and a third CEP ellipse;
comparing the angle difference value to an angle difference threshold;
in response to the angle difference value being less than the angle difference threshold, proceeding with the orbital radius determination; and
in response to the angle difference value being greater than the angle difference threshold, forgoing the orbital radius determination.

7. The method of claim 6, further comprising:
determining an angular direction of the plurality of CEP ellipses;
comparing a sign of the angle difference value to the angular direction of the plurality of CEP ellipses;
in response to the sign of the angle difference value matching the angular direction of the plurality of CEP ellipses, proceeding with the orbital radius determination; and
in response to the sign of the angle difference value not matching the angular direction of the plurality of CEP ellipses, foregoing the orbital radius determination.

8. The method of claim 6, further comprising:
calculating an average distance value using a first distance $k_1$ between the first and second CEP ellipses and a second distance $k_2$ between the second CEP and third CEP ellipses; and
calculating the curvature radius of the plurality of CEP ellipses based on the angle difference value and the average distance value.

9. The method of claim 8, further comprising:
calculating an angle minimum value based on an orbit period of the target wireless station and the time difference so that (i) the angle difference threshold corresponds to a multiple of the angle minimum value, and (ii) calculating the curvature radius of the plurality of CEP ellipses based on the angle difference value and the average distance value comprises calculating the curvature radius based on the angle minimum value.

10. The method of claim 1, wherein generating the adjusted CEP ellipse comprises generating the adjusted CEP ellipse with a radius corresponding to a multiple of the curvature radius.

11. A measuring station configured to generate a circular error probability (CEP) ellipse that encompasses the location of a target wireless station, the measuring station comprising:
at least one memory device with computer-executable instructions stored thereon; and at least one processor for executing the computer-executable instructions stored on the at least one memory device, wherein execution of the computer-executable instructions by the at least one processor causes the at least one processor to perform operations comprising:
receiving a plurality of beacons transmitted by a target wireless station;
identifying a plurality of Time of Departures (TODs) and a plurality of Time of Arrivals (TOAs) corresponding to the plurality of beacons;
determining a plurality of Times of Flight (TOFs) corresponding to the plurality of beacons based on the plurality of TODs and the plurality of TOAs;
calculating a plurality of CEP ellipses for the target wireless station based, at least in part, on the plurality of TOFs;
determining whether the plurality of CEP ellipses exhibit an orbital radius;
in response to determining that the plurality of CEP ellipses do exhibit an orbital radius, calculating a curvature radius of the plurality of CEP ellipses; and
generating, based on the curvature radius of the plurality of CEP ellipses, an adjusted CEP ellipse encompassing a location of the target wireless station.

12. The measuring station of claim 11, wherein identifying the plurality of TODs comprises retrieving, from each of the plurality of beacons, a time of transmission determined by a timer associated with the target wireless station and identifying the plurality of TOAs comprises determining, for each of the plurality of beacons, an arrival time using a timer associated with the measuring station.

13. The measuring station of claim 12, wherein execution of the computer-executable instructions by the at least one processor causes the at least one processor to perform further operations comprising:
in response to determining that the target wireless station has completed at least one orbit, synchronizing the timer associated with the target wireless station with the timer associated with the measuring station,
wherein determining the plurality of TOFs corresponding to the plurality of beacons based on the plurality of TODs and the plurality of TOAs further comprises determining the plurality of TOFs based on the synchronization of the timer associated with the target wireless station and the timer associated with the measuring station.

14. The measuring station of claim 11, wherein determining whether the plurality of CEP ellipses exhibit an orbital radius comprises:
recording a time t for each CEP ellipse; and
for each consecutive pair of CEP ellipses, calculating an angle $\gamma$ of a reference line connecting the pair of CEP ellipses.

15. The measuring station of claim 14, wherein execution of the computer-executable instructions by the at least one processor causes the at least one processor to perform operations comprising:
calculating a time difference value between times t for a consecutive pair of CEP ellipses;
comparing the time difference value to a time difference threshold;
in response to the time difference value being less than the time difference threshold, proceeding with the orbital radius determination; and in response to the time difference value being greater than the time difference threshold, forgoing the orbital radius determination.

16. The measuring station of claim 15, wherein execution of the computer-executable instructions by the at least one processor causes the at least one processor to perform operations comprising:

calculating an angle difference value between a first angle $\gamma_1$ corresponding to a first and second CEP ellipse and a second angle $\gamma_2$ corresponding to the second CEP ellipse and a third CEP ellipse;

comparing the angle difference value to an angle difference threshold;

in response to the angle difference value being less than the angle difference threshold, proceeding with the orbital radius determination; and in response to the angle difference value being greater than the angle difference threshold, forgoing the orbital radius determination.

17. The measuring station of claim 16, wherein execution of the computer-executable instructions by the at least one processor causes the at least one processor to perform operations comprising:

determining an angular direction of the plurality of CEP ellipses;

comparing a sign of the angle difference value to the angular direction of the plurality of CEP ellipses;

in response to the sign of the angle difference value matching the angular direction of the plurality of CEP ellipses, proceeding with the orbital radius determination; and in response to the sign of the angle difference value not matching the angular direction of the plurality of CEP ellipses, foregoing the orbital radius determination.

18. The measuring station of claim 16, wherein execution of the computer-executable instructions by the at least one processor causes the at least one processor to perform operations comprising:

calculating an average distance value using a first distance $k_1$ between the first and second CEP ellipses and a second distance $k_2$ between the second CEP and third CEP ellipses; and calculating the curvature radius of the plurality of CEP ellipses based on the angle difference value and the average distance value.

19. The measuring station of claim 18, wherein execution of the computer-executable instructions by the at least one processor causes the at least one processor to perform operations comprising:

calculating an angle minimum value based on an orbit period of the target wireless station and the time difference so that (i) the angle difference threshold corresponds to a multiple of the angle minimum value and (ii) calculating the curvature radius of the plurality of CEP ellipses based on the angle difference value and the average distance value comprises calculating the curvature radius based on the angle minimum value.

20. The measuring station of claim 11, wherein generating the adjusted CEP ellipse comprises generating the adjusted CEP ellipse with a radius corresponding to a multiple of the curvature radius.

* * * * *